(No Model.) 2 Sheets—Sheet 1.
E. E. GOLD.
PIPE COUPLING FOR RAILROAD CARS.
No. 392,424. Patented Nov. 6, 1888.
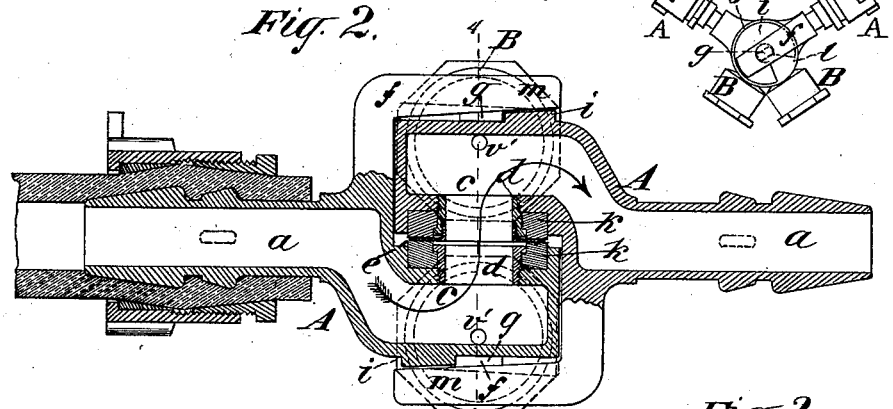
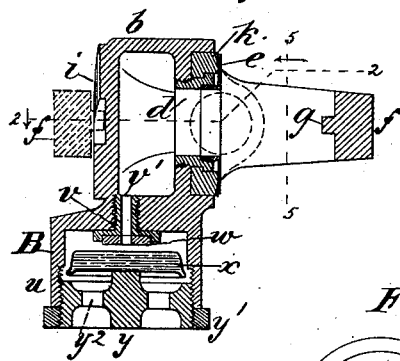
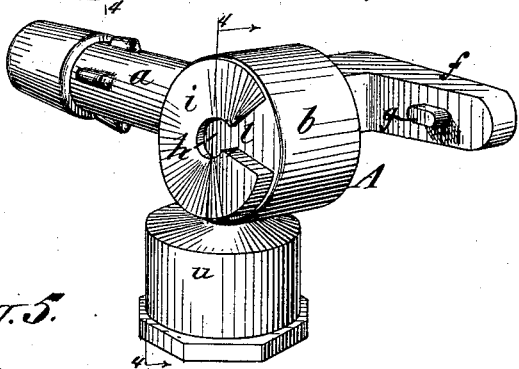
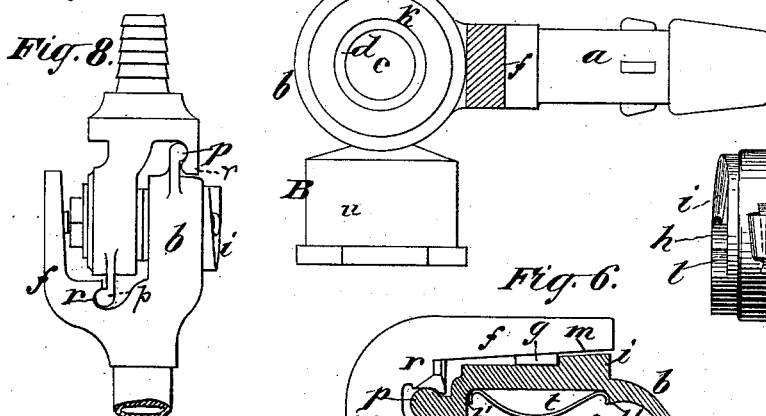
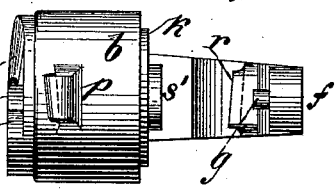
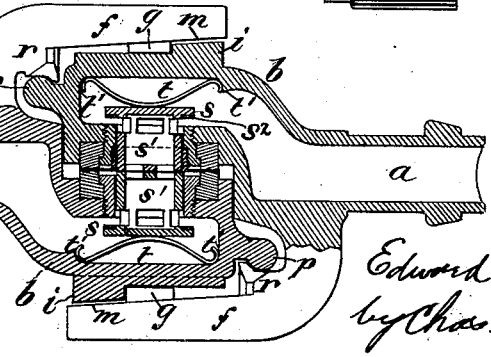
WITNESSES.
John Becker.
Jno. E. Travin.
INVENTOR.
Edward E. Gold.
by Chas. M. Higgins
Attorney.

(No Model.) 2 Sheets—Sheet 2.

E. E. GOLD.
PIPE COUPLING FOR RAILROAD CARS.

No. 392,424. Patented Nov. 6, 1888.

WITNESSES:
John Becker.
C. K. Fraser.

INVENTOR:
Edward E. Gold,
By his Attorneys,
Arthur E. Fraser & Co.

UNITED STATES PATENT OFFICE.

EDWARD E. GOLD, OF NEW YORK, N. Y.

PIPE-COUPLING FOR RAILROAD-CARS.

SPECIFICATION forming part of Letters Patent No. 392,424, dated November 6, 1888.

Application filed June 17, 1887. Serial No. 241,591. (No model.)

*To all whom it may concern:*

Be it known that I, EDWARD E. GOLD, of New York city, county and State of New York, have invented certain new and useful Improvements in Pipe-Couplings for Railroad-Cars, of which the following is a specification.

My invention relates to that class of couplings used for the air-brakes or steam-heating pipes of railway-cars, which consist of two similar interlocking halves fixed on a short length of hose attached to the terminal ends of the pipes, which halves are formed with lateral orifices which fit together sidewise when the two halves are engaged with each other by a rotary wedging movement. In one form of this class of couplings known as the "Westinghouse" each half is formed with inclined hooks which engage together with a wedging action when the halves are coupled, while in another form of coupling of this class each half is formed with a central pintle and socket forming a pivotal connection when put together, while wedging or cam inclines around the socket act against the pintle-arms and cause the two halves to be clamped together when partly rotated on each other or allowed to sag into an inclined position.

My invention is more especially related to the latter form of coupling.

Figure 9:
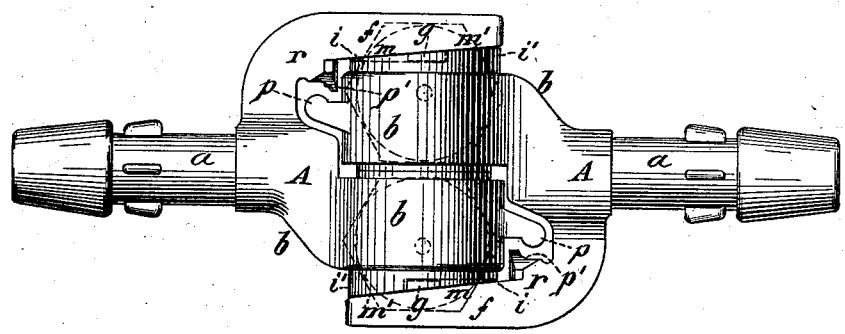
Figure 10:
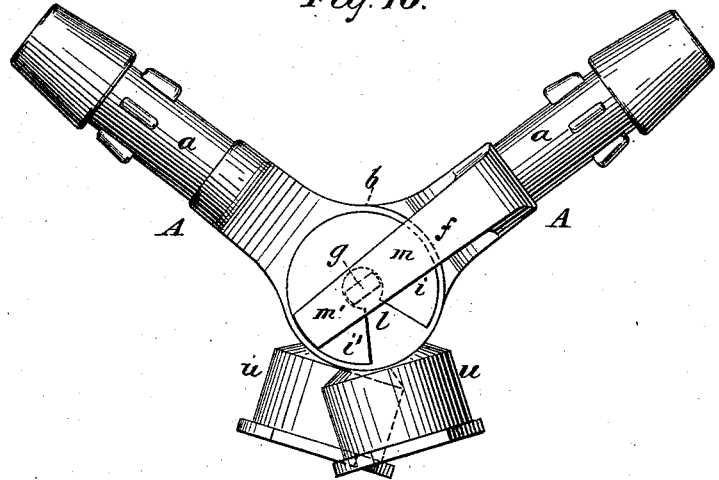

In the annexed drawings, Figure 1 gives a side elevation of my improved coupling, shown in its sagged or coupled position. Fig. 2 is a longitudinal section of the coupling on a larger scale, cut on the line 2 2 in Fig. 4. Fig. 3 is a perspective view of one-half of the coupling. Fig. 4 is a cross-section on the line 4 4 in Figs. 2 and 3. Fig. 5 is a section on the line 5 5 in Fig. 4, looking toward the coupling face or orifice. Fig. 6 is a longitudinal section of the complete or preferred form of my improved coupling, and Fig. 7 is an end elevation of one-half thereof. Fig. 8 shows the half of a Westinghouse and the half of my coupling engaged together. Fig. 9 is a plan of the coupling shown in Figs. 6 and 7, and Fig. 10 is a side elevation of the same in the coupled position.

I will first describe the simpler form of my coupling shown in the first figures.

Referring to Figs. 1 to 5, A A indicate the two halves of the coupling, which, as shown, are alike, each terminating with the tubular neck $a\ a$, on which the short length of hose is clamped to connect the coupling with the main pipe of the cars, as illustrated on the left of Fig. 2. The opposite or meeting ends of the halves are formed with hollow drums or cylindrical bowls $b\ b$, which have lateral orifices $c\ c$, and are preferably set to one side of a plane coincident with the axis of the necks $a$, so that when the halves are put together and the orifices $c$ meet the plane of their junction is about central or in line with the axis of the tubular necks, as well shown in Fig. 2.

Each orifice $c$ is provided with a packing-ring, $k$, of some elastic material—such as rubber, asbestos, or Jenkin's composition, preferably the latter—and this packing-ring is socketed in a groove or recess in the junction-face of the head, and is held in place by a screw-thimble, $d$, which screws at one end into the tapped sides of the orifice, while the opposite end has a rim or shoulder to bear on a shouldered recess in the ring.

The packing-rings project above the face of the heads and above the shouldered end of the thimble, so that when the two halves are put together the packing-rings are pressed against each other to make the joint air-tight or steam-tight, and the junction edge of the rings is preferably flat or level, as shown. I prefer, however, not to have the packing-rings' junction directly together; but I interpose between them a thin elastic metal disk or ring, $e$, preferably formed of spun brass having a true level surface which closely overlies one of the rings and has a screw-neck which screws into the thimble $d$, thus holding it snugly in place upon the packing-ring. Hence when the halves of the coupling are junctioned, as shown in Fig. 2, the thin metal disk will be interposed between the elastic packing-rings, which will be now compressed against each other or against opposite sides of the metal disk, thus providing a steam-tight joint and preventing the sticking of the elastic rings together, as would be likely to happen if they should come in direct contact. The metal disk being very thin and elastic or springy, it will yield to the pressure of the rings and accommodate itself to any irregularities therein, and thus maintain a tight, sure, and durable joint, as will be readily appreciated.

Each coupling-head is formed on the opposite side of the plane of junction from the bowl *b* with a locking-arm, *f*, projecting from the neck *a* and extending across the open side of the bowl at a sufficient distance therefrom to admit the bowl *b* of the opposite head, as will be seen in Fig. 2. Each of these crank-arms is provided on its inner side with a short projecting trunnion boss or pintle, *g*, in line with the coupling-axis, and on the outer or closed side of each bowl is formed a central socket or recess, *h*, to receive said pintle, as seen best in Fig. 3.

The outer or closed side of each coupling-bowl *b* is formed or provided with two diametrically-opposite wedging inclines, *i* and *i'*, which are most simply and conveniently constructed as a continuously-rising incline extending concentrically around the socket *h*, as shown. This incline has a segmental gap left in on one side ending in a narrow entrance, *l*, leading into the socket *h*, and the pintle *g* is preferably of oblong or oval form, which in its narrowest direction will just pass through the entrance *l* into the socket *h*, in which its longest direction will just fit diametrically and freely turn therein, as will be understood from Figs. 2 and 3.

The inner face of each of the locking-arms *f f* is shaped to conform to the inclines *i i'*, bearing against them on opposite sides of the pintle *g* at *m m'*. When the two halves of the coupling are intermeshed or slid together in line with each other, the pintles *g* will freely slide through the gap or entrance *l* into the sockets *h*, and the inclined faces *m m'* on the arms *f* will contact with the wedging inclines *i i'*, while the orifices *c* will coincide with each other and the packing-rings *k* abut.

If, now, the two halves are rotated slightly upon each other or allowed simply to sag into the angular position shown in Fig. 1, (a position which the natural droop of the coupling-hose between the cars will cause the coupling to assume,) the inclined faces *m m'*, thereby tending to mount the inclines *i i'*, will cause the two halves to be pressed forcibly against each other, so as to compress the packing-rings *k k*, and thus render the joint between the halves steam or air tight, and thereby couple the pipes of the two cars together effectually and render the passage continuous through the coupling, as indicated by the arrow in Fig. 2. It will be also seen on reference to Fig. 1 that when the two halves of the coupling are thus rotated on each other to an angular position the oblong trunnion-pintle *g* (shown by dotted lines in Fig. 1) will revolve out of line with the gap *l*, or nearly at right angles thereto, so that the two halves thus become locked against accidental uncoupling while they remain in such angular or sagging position, into which they will naturally gravitate and remain during all normal conditions. If, however, the cars should become uncoupled accidentally by the breakage of the draw heads or bars, or if the cars should be uncoupled intentionally without first uncoupling the pipe-couplings, the tension or strain thus put upon the coupling-hose as the cars separate will immediately raise the two halves of the coupling into line with each other where the oblong pintles *g* come in line with the gaps *l*, and hence as the separating pull on the parts continues the pintles will slip out of the sockets *g*, and the two halves will automatically separate without any violence to their parts.

My invention provides two diametrically-opposite wedging bearing-contacts between the locking-arm *f* and the outer face of the bowl *b* instead of only one such contact on one side of the coupling-axis. Although a continuously-rising incline, *i i'*, is shown in the drawings, yet this construction is not essential, since the portion *i* contacts only with the part *m* of the bearing-face of the arm *f*, while the portion *i'* contacts only with the part *m'* of the arm. This is due in the construction shown to the oscillatory locking movement being limited to less than a half-revolution. The direction of inclination and the pitch of both inclines (or portions of the incline) *i* and *i'* are the same, and both faces *m* and *m'* bear equally upon them, so that in the locking movement both inclines act alike to force the two heads together, and hence a broad and even bearing is obtained against each locking-arm and head, which insures the pressure of the halves evenly and centrally together in line with the axis of the orifices *c*, and prevents the two halves tilting out of line or pressing unevenly or rocking on the edge of the packing-rings, which is likely to happen where two single wedging inclines are employed having opposite inclinations or being of right and left pitch, respectively, and the trunnion-arms are made with a straight face, so as to be adapted to either incline, with the object of making the couplings wedge together in either direction of rotation, as has been the case in a former coupling of this type.

In my coupling the halves will wedge together in one direction of rotation only; but this is all that is required, for as the halves are alike and similarly positioned on the hose any two halves meeting at the ends of two cars will always couple together by an intermeshing and a rotary wedging motion in the same direction.

Figs. 6, 7, 9, and 10 illustrate the complete form of my improved coupling, which I prefer, particularly where it is used for air-brake pipes, the simpler form already described being preferred for steam-heating, although either form may be used. In this case each half of the coupling has inclined male and female hooks *p* and *r*, which respectively intermesh when the halves are rotated together in addition to the trunnion-pintles *g* and inclines *i*, already described, and fully shown in Fig. 6. These inclined intermeshing male and female hooks are substantially the same as used on the Westinghouse couplings, the male hooks *p* projecting from the bowl *b* of the coupling, while the female hooks *r* are formed on the bend or curve in the crank-arms *f* in positions corresponding to the same hooks on the Westinghouse coupling and of the same size, as shown in Fig. 8. Hence the half of my coupling may intermesh with the half of a Westinghouse coupling, as seen in Fig. 8, the dimensions of both halves being the same and the size of the valve-seats or packing-rings being identical on both halves, so that they will junction together accurately and tightly on the meeting faces. In this case, as shown in Fig. 8, the hooks $p\ r$ only engage to hold the halves together, as in the Westinghouse coupling, the trunnion-pintle and incline on the half of my coupling being of course idle. When, however, the two halves of my coupling are put together, both the pintles and inclines $g\ i$, as well as the hooks $p\ r$, engage and act to hold the halves together when rotated into the angular position, as already described with reference to Fig. 1; but both hooks and inclines will become disengaged to allow the halves to separate when rotated back to a straight line, as already described.

The advantage of having my coupling intermesh with the Westinghouse or couplings of other kinds will be obvious, as cars differently equipped may thus be coupled without any alteration or trouble, which is of great importance.

In my preferred form of coupling (shown in Fig. 6) I also prefer to provide the junction orifices $c\ c$ with inwardly-opening check-valves $s\ s$, which will be normally forced to their seat upon the end of thimble $d$ by a bow-spring, $t$, the ends of which rest against the bottom of the bowl $b$, while the curve bears upon the valves, as shown, thus constantly tending to close the orifices interiorly. The valve disks $s$ are secured to a tubular neck, $s'$, which slides freely in the thimble, and thus acts as a guide, the inner end next to the disk being slotted to permit communication when the valve is lifted, as seen in Fig. 6, while the outer end normally protrudes slightly from the packing-ring or junction face of the half-couplings, as seen in Fig. 7. Hence when the two halves are put together the protruding necks $s'$ abut and are forced inward against the action of their springs $t$, thus automatically opening the valves and establishing free communication through the coupling, as seen in Fig. 6. When, however, the halves are separated, the valves will be forced to their seats by the action of the springs $t$, thus closing the orifices automatically and preventing the leakage of the steam or other fluid. The form of the spring $t$ is very simple, strong, and durable, and may be easily slipped in place before the screwing in of the thimble $d$ with the valve and guide-neck $s\ s'$, and the stops $t'$ at each end of the spring prevent the spring from being flattened too far and hold the spring in place. The valve-disks $f$ are faced with Jenkin's composition, as at $s^2$, or other suitable packing, or the face may be grooved to match a grooved face on the end of thimble $d$.

Referring to Figs. 1, 2, 3, 4, 5, 9, and 10, it will be noted that I provide the bowl of each half of the coupling with a small thermostatic trap, B. The chamber of this trap is a small cylinder, $u$, preferably cast integral with the bowl $b$ and in a pendent position on the under side thereof, as illustrated best in Figs. 3, 4, and 5. This chamber communicates with the interior of the bowl at the lowermost point by a small drip-opening, $v'$, made through a thimble, $v$, which is screwed through from chamber to bowl, as shown best in Fig. 4, and is provided with a valve-seat, $w$, preferably of Jenkin's composition or other elastic material, recessed into the head of the thimble, as shown. Below this valve-seat is the expansible thermostatic vessel $x$, supported upon the adjustable screw-plug $y$, screwed into the open mouth or base of the casing $u$, and $y'$ is a lock-nut which screws on the end of the plug against the edge of the chamber.

$y^2$ are perforations in the plug to allow the free escape of the condensation when the trap acts. This trap is thus of substantially the same construction as shown in my former patent, No. 350,880, of October 12, 1886. By placing these thermostatic traps directly on the bowls of each half of the coupling the condensation is removed directly from the couplings, and the pipes connected therewith just at the junction-faces and at the lowest point of the cavity in the couplings, which, as shown in Fig. 4, is below the meeting orifices $c$, so that the orifices of the couplings are kept free and unobstructed by any accumulations of water, and freezing of the couplings or obstruction of the flow of steam is effectually prevented.

What I claim as my invention is—

1. In a hose-coupling consisting of two laterally-engaging heads adapted to lock together with an oscillatory wedging movement, the combination of one head having a projecting arm constructed to embrace the other head, formed with bearing-surfaces on diametrically-opposite sides of the coupling-axis, with the other coupling-head formed with wedging inclines on diametrically-opposite sides of the coupling-axis, both inclined in the same rotary direction and adapted to simultaneously engage said bearing-surfaces on the arm, whereby the wedging thrust is equalized on opposite sides of the axis and all canting of the heads is avoided.

2. In a hose-coupling consisting of two laterally-engaging heads adapted to lock together with an oscillatory wedging movement, the combination of one head having a projecting arm constructed to embrace the other head, formed with a pintle in the coupling-axis, and with bearing-surfaces on diametrically-opposite sides of said pintle, with the other coupling-head formed with a socket for said pintle and with wedging inclines on diametrically-opposite sides of said socket, both inclined in the same rotary direction and adapted to simultaneously engage said bearing-surfaces on the arm, whereby the wedging-thrust is equalized on opposite sides of the axis and all canting of the heads is avoided.

3. In a hose coupling of the class wherein two laterally-engaging heads are locked together by an oscillatory wedging movement, a coupling-head constructed with a bowl having an opening in one side and on the opposite side formed with two wedging inclines on diametrically-opposite sides of the coupling-axis inclined both in the same rotary direction, and an arm projecting past the open side of the bowl at a sufficient distance therefrom to admit the bowl of another coupling-head between, and formed with two bearing-surfaces on opposite sides of the coupling-axis, whereby when two such heads are coupled together the arm of each engages both the inclines of the other and all canting of either head is prevented.

4. A hose-coupling head constructed with a bowl having wedging inclines on its closed side and an engaging-hook at its end, with a locking-arm projecting past the open side of the bowl at a sufficient distance therefrom to admit the bowl of another coupling-head between, and formed with bearing-surfaces and with a notch or recess at the base of said arm adapted to receive an engaging-hook on the end of the bowl of another coupling-head, whereby the head is adapted for engagement either with a head having wedging inclines on the closed side of its bowl or with one having an engaging-hook and recess, such as the Westinghouse coupling.

EDWARD E. GOLD.

Witnesses:
JNO. E. GAVIN,
CHAS. M. HIGGINS.